J. S. METCALF.
Scoop-Shovel for Unloading Cars.

No. 225,531.      Patented Mar. 16, 1880.

UNITED STATES PATENT OFFICE.

JOHN S. METCALF, OF INDIANAPOLIS, INDIANA.

SCOOP-SHOVEL FOR UNLOADING CARS.

SPECIFICATION forming part of Letters Patent No. 225,531, dated March 16, 1880.

Application filed December 22, 1879.

*To all whom it may concern:*

Be it known that I, JOHN S. METCALF, of Indianapolis, county of Marion, and State of Indiana, have invented a new and useful Improvement in Scoop-Shovels for Removing Ear-Corn from Cars or other places, of which the following is a description, reference being had to the accompanying drawings.

Prior to my invention various kinds of scoop-shovels have been used by elevator-men for the purpose of unloading bulk grain, all of which prove utterly worthless when employed in the unloading of ear-corn from the cars, owing to the fact that when ear-corn becomes packed in the car it is hard work to force any ordinary shovel deep enough into it to do any good. Hence elevator-men have been compelled to resort to the old method of hand-shoveling, which is very laborious, and will require the labor of at least four expert workmen three-quarters of an hour to unload a car containing four hundred bushels of ear-corn.

The object of my invention is to provide a scoop-shovel by means of which the unloading of ear-corn under any circumstances when the scoop can be used can be rapidly and easily effected by one man in much less time than the same work can be accomplished by the old way.

My invention consists of a scoop provided with teeth or prongs. The upper front edges of the sides of the scoop are provided with prongs to prevent corn from rolling off sidewise. The bottom is also provided with a series of prongs having their extreme outer ends slightly curved upward. The two outside bottom prongs have their ends turned up or provided with pulleys, and project beyond and slightly below the middle teeth, so as to prevent the middle prongs from catching in the car-floor while unloading the car, as will be hereinafter fully described in the specification, and then set forth in the claims.

Figure 1:
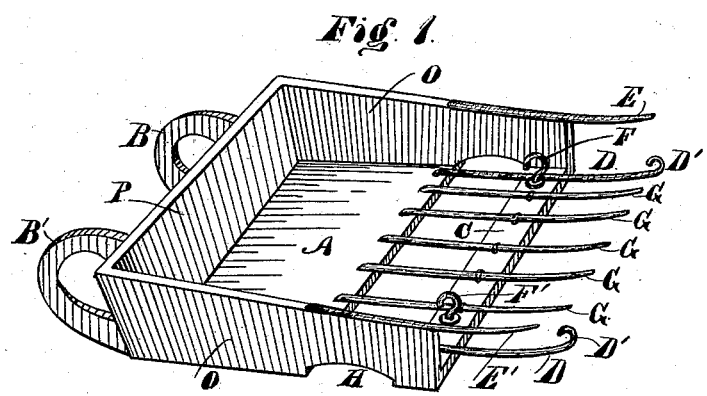
Figure 2:
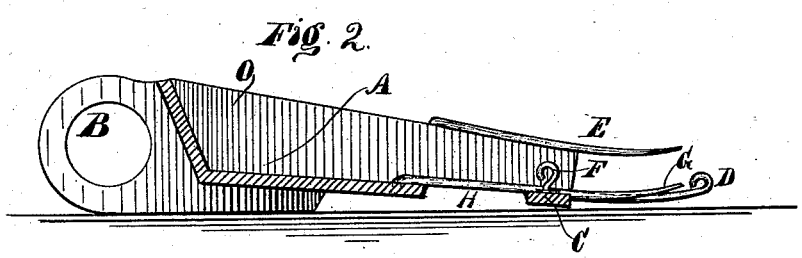

In the accompanying drawings, in which like letters of reference in the different figures indicate like parts, Figure 1 represents a perspective view of my improved scoop-shovel, and Fig. 2 is a longitudinal sectional view of the same.

A and C represent the bottom; O O, the sides; P, the back; B B', the handles; E E', the outside side prongs; D D', the bottom outside prongs with turned-up ends; G, the inside prongs; F F', the hooks by means of which the ordinary drag apparatus is attached to the shovel; H, the open space between the bar C and the main bottom A.

The general construction of the scoop is clearly shown in Fig. 1. The prongs E E' are firmly secured to the upper edges of the sides O O, so that their sharp curved ends will project several inches beyond the ends of the sides. These upper side prongs are used to prevent the ear-corn from rolling off at the sides. The two outer lower prongs, D D', are secured to the bottom A and to the bar C, substantially as shown. The extreme outer ends of these prongs are turned up or provided with small rollers, which project beyond and slightly below the middle prongs, G, for the purpose of preventing the points of the prongs from catching in the car-floor, as shown more fully in Fig. 2. The middle prongs, G, are also secured to the bottom A and bar C, as shown, thus forming a screen in the space H, between the bar C and bottom A. The handles B B' are attached to the scoop A in the ordinary manner. The hooks F F' are secured to the bar C in the ordinary manner, for the purpose of attaching the shovel to the ordinary pulley-and-drag apparatus for operating the shovel by power.

Having thus described my invention, I will now describe its mode of operation. The drag apparatus (not shown) being attached, the workmen dip the shovel into a load of ear-corn. The prongs slide easily and smoothly into the corn. It is then dragged out in the ordinary way, after which the operation is repeated until the car is empty.

During the act of unloading the corn there is no danger of hurting the shoveler, because the prongs cannot catch in the cracks in the car-floor.

It is obvious that the ends of all the prongs may be turned up to prevent them catching on the floor; but I prefer the arrangement shown in the drawings.

What I claim as new, and desire to secure by Letters Patent, is—

1. In the scoop-shovel, the combination of the scoop-body A C O O P, the short curved middle prongs, G, and longer side prongs, D, with turned-up ends D', constructed and arranged to operate substantially as shown and described.

2. In combination, the shovel A C, the short curved middle prongs, G, the longer side prongs, D, and curved projecting side prongs, E E', as and for the purpose specified.

3. In the scoop-shovel constructed as described, the prongs D D', having their outer ends projecting beyond and slightly below the middle prongs, G, as and for the purpose specified.

4. In the scoop-shovel constructed as described, the projecting prongs G, having their extreme outer ends turned up, substantially as shown and described.

In testimony whereof I have signed my name to this specification in the presence of two subscribing witnesses.

JOHN S. METCALF.

Witnesses:
 E. O. FRINK,
 G. H. RENNETT.